Aug. 4, 1931.  G. H. PETRI  1,817,643
FORMING MACHINE FOR PLASTIC MATERIAL
Filed July 18, 1924   2 Sheets-Sheet 1
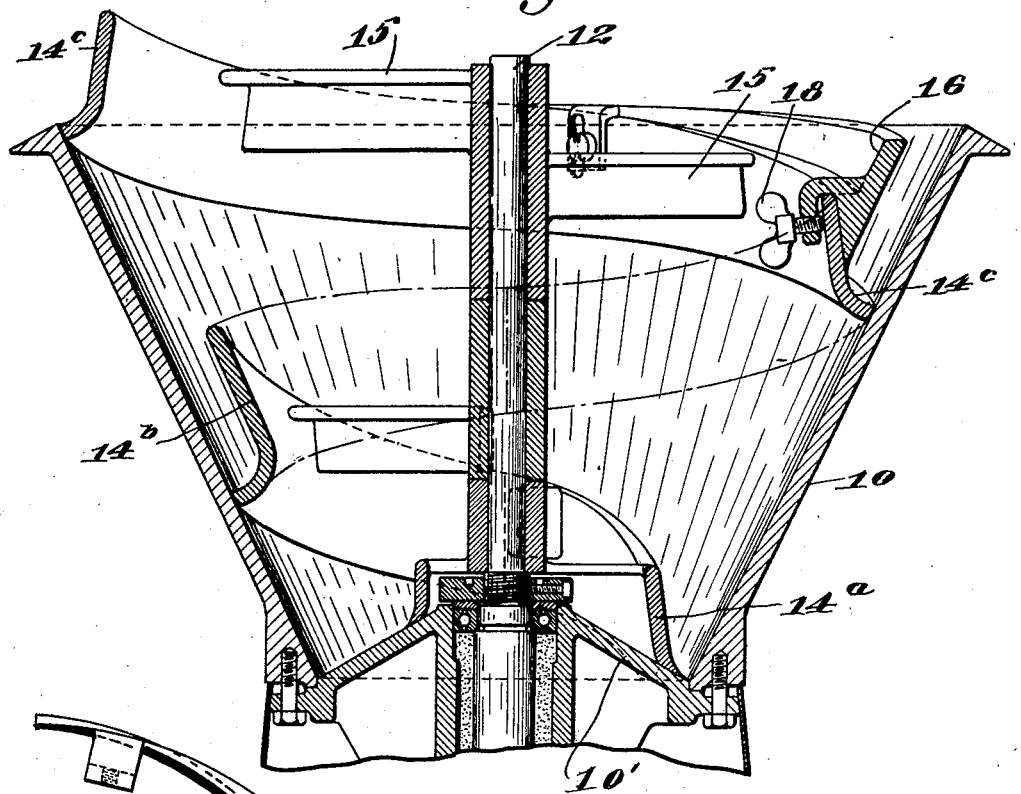
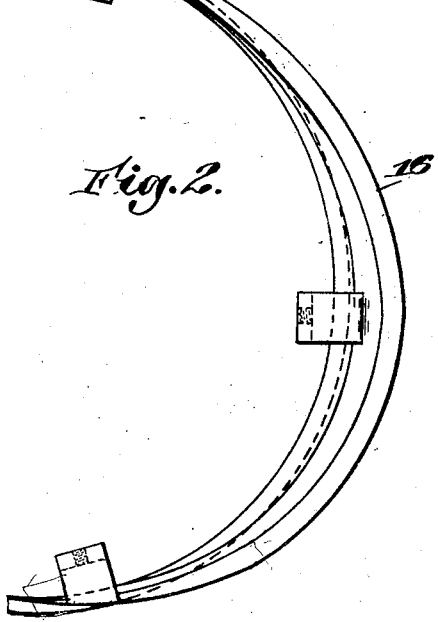
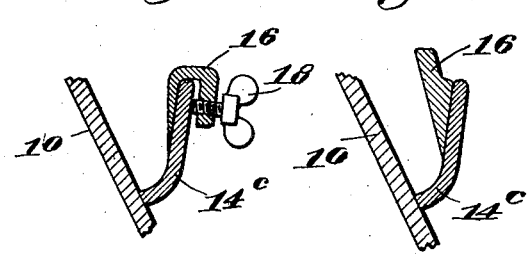
Inventor
Gunther H. Petri
by Mitchell, Chadwick & Kent
Attorneys

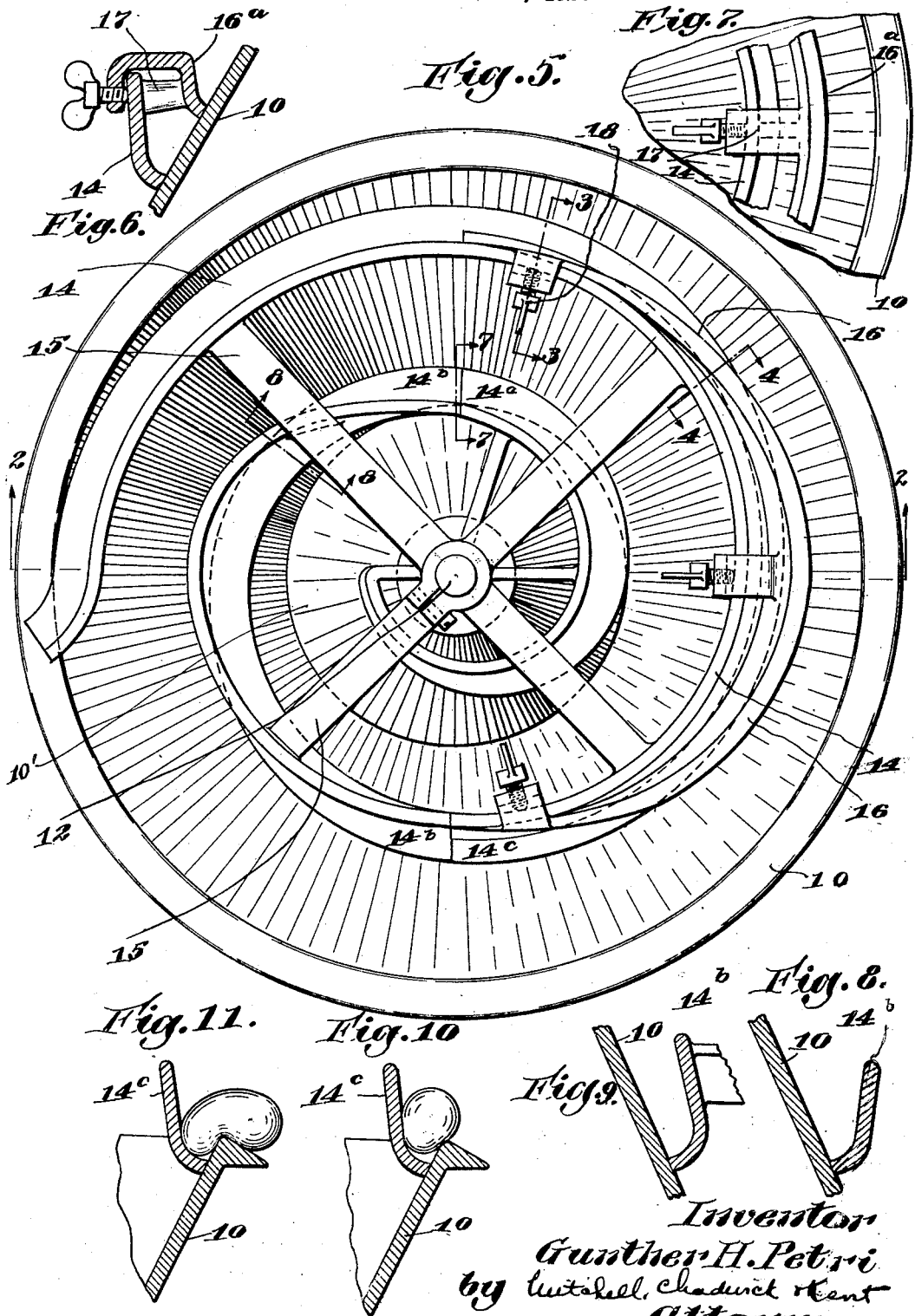

Patented Aug. 4, 1931

1,817,643

UNITED STATES PATENT OFFICE

GUNTHER H. PETRI, OF BROOKLINE, MASSACHUSETTS

FORMING MACHINE FOR PLASTIC MATERIAL

Application filed July 18, 1924. Serial No. 726,743.

This invention relates to improvements in forming machines for plastic material, and more especially to that type of such machines known as rounders. It has already been satisfactorily demonstrated that a mass of dough can be handled mechanically in rounders, so as to be delivered therefrom in the general shape of a ball, but it is an object of the present invention to provide means whereby a more nearly perfect ball of dough can be formed, with its substance made dense and firm more satisfactorily than is now possible in the most successful types of these machines. The invention also provides for adapting a rounder to handle smaller sized balls than those for which it is normally adapted, as, for example, to round up either loaves of bread or rolls.

A particular design of rounder to which the invention may readily be applied is disclosed in my copending application Serial No. 594,065 in which the mass of dough is caused to roll along a helical U-shaped trough formed between a stationary dough race and a rotating conical kneading table. It has been the practice in such machines to depend upon the weight of the dough itself to cause the mass to settle well down into the trough as it is rolled along, thereby gradually producing to some degree a much desired compact texture of the dough. The density attained, however, is not as great as is wished for, because it still will flatten too readily when it reaches the upper end of the trough and is discharged therefrom.

The invention also makes it possible for small bakeries to have the advantages of machine rounding, in cases where there is not work enough to justify the purchase of a rounding machine for each size of dough balls, by providing so that a single machine by means of the invention, is convertible to handle either of a plurality of sizes of balls. This is accomplished by making a spiral and helical filler plate, or succession of plates, which will fill the trough along the face of the race so that the race trough will have its working face at the proper distance and angle for whatever kind of dough mass it is desired to handle. In some cases this will give the dough mass a longer travel than is customary or necessary; but for a small batch this adds only a negligible amount to the cost, and in general makes an improved product. By changing plates the baker then makes a single machine serve for all of his rounding of various sizes.

The present invention attains improvements upon prior constructions by altering the shape of the trough so that at one or more places the normally diverging sides of the trough stand closer together and in more nearly parallel relation. This may be accomplished by casting the dough race initially with the narrow portions, or it may be preferable to leave the trough sections as shown in my copending case already referred to, and to provide an auxiliary plate that can be clamped to the dough race where desired, as a sort of shim or filler and thus narrow the effective trough opening. In either case the transverse distance between sides is made smaller and in so doing provides a compressing portion for the dough. The alteration of trough shape is made gradual, and thus the approaching dough readily accommodates itself to the contracted portion or portions. In so doing it becomes more firmly compressed, better capable of retaining its spherical shape upon and after discharge from the rounder, and making better bread.

It is intended that the patent shall cover, by suitable expression in the appended claims, whatever features of patentable novelty exist in the invention disclosed.

In the drawings:

Figure 1 is a medial section of a conical rounder with a portion of its dough race constructed in accordance with the present invention, and with another portion provided with a compression plate constituting another embodiment of the present invention;

Figure 2 is a plan of the compressing plate;

Figures 3 and 4 are elevations in section on lines 3—3 and 4—4 respectively of Figure 5 showing the variations in the trough opening effected by the compressing plate;

Figure 5 is a plan of the apparatus of Figure 1;

Figure 6 is an elevation, in section, of a portion of a race and bowl with auxiliary spacer plate for changing the size of the trough;

Figure 7 is a plan of the parts shown in Figure 6;

Figures 8 and 9 are elevations in section on lines 8—8 and 7—7 respectively of Figure 5 showing the relation between the dough race and bowl at different points along the compressing portion of the race; and Figures 10 and 11 are views of a section of the apparatus near the place of discharge, showing in Figure 11 the shape of the ball as formed in machines heretofore constructed, which it is an object of the invention to avoid, and showing in Figure 10 the shape of the ball after traversing a trough embodying the present invention.

Referring to the drawings, a conical kneading table or bowl 10 is shown rotatably supported on a stationary standard 12 about which it is adapted to be revolved by any suitable means (not shown). This standard serves as the support for a spiral helical dough race 14, preferably made in sections 14$^a$, 14$^b$ and 14$^c$, each carried by supporting arms 15 which clamp upon the standard.

The lowest section 14$^a$ of the series begins close to the standard 12, progresses downward helically and spirally outward from it, close over the convex surface of the conical bottom 10', until the bottom edge of the race section is close to the concave face of the table, from which point the section continues spirally outward but helically upward in close relation to the table surface until it has progressed a distance about three-fourths way around the standard. This section of the race is of the usual configuration, having a dough engaging face which stands upward at an angle, diverging from the face of the bowl to form in conjunction therewith a somewhat U-shaped trough for the dough. At its discharge end the section 14$^a$ substantially registers with the receiving end of the next race section 14$^b$ which is here shown as constructed in accordance with the principles of the present invention.

The side of the dough engaging face of this section, at its beginning, diverges from the bowl face, as seen in Figure 8, but immediately thereafter the divergence becomes less, as it starts to approach the surface of the bowl, (see Figure 9) until at the middle of the section (see Figure 1) it is substantially parallel thereto. Thus the trough opening through which the masses of dough move grows gradually narrower as the transverse distance between the side face of the race and the table grows smaller. In consequence and as gravity is holding it down in this narrowed space, the ball of dough is gradually compressed and made firmer as it travels. From its middle point on, the side face of section 14$^b$ alters its relation to the bowl in the reverse manner; so that when its discharge end is reached it is again diverging from the bowl face as it began. Here the receiving end of the next section 14$^c$ takes the dough ball.

This section 14$^c$ is illustrated as having the usual configuration, although a compressing portion might be provided integral therewith when the race is cast, similar to that just described in connection with section 14$^b$. However it is represented thus in order to illustrate another method of obtaining a compression portion which is possible even though the race itself is formed in the usual shape. This involves the use of a compressing plate 16, which may be clamped by suitable means 18 to any portion of the race desired, to form a sort of filler in the trough. The plate is made relatively thin at its ends as seen in Figures 2, 3 and 5, so that there may be no abrupt obstruction encountered by the dough; but between its entrance end and its middle (see Figure 4) its dough engaging face more closely approaches the bowl thus producing a gradually narrowing trough portion as described in connection with section 14$^b$. This is conveniently arranged by making the plate gradually become thicker. Similarly from the middle on the plate grows thinner, and its face diverges increasingly from the bowl, until at its discharge end it tapers off to almost a knife edge. The dough balls in passing the plate are similarly compressed and conditioned as heretofore described, so that when discharged they are more dense in composition and have greater shape-retaining qualities. A plurality of such compressing plates may be provided, with differing degress of approach to the table face, if this is found useful, which can be used selectively according to the work being done.

As illustrative of the beneficial results obtained by the compressing sections of the dough race, whether provided by the race itself or by the auxiliary compressing plate, Figure 11 shows how in the ordinary uniformly U-shaped trough the dough ball arrives at the top of the bowl in a distinctly ovoid shape somewhat larger at the upper part than at the bottom which is deeper in the trough. The dough is still plastic enough to permit the larger and top heavy part to topple over the edge of the bowl, and thereafter when placed on a conveyor belt or tray to permit it to settle into a somewhat flattened mass. While traversing the compression portions of the race provided by the present invention, the mass is made so much denser that it acquires and can hold a more truly spheroidal shape (as in Figure 10) while passing onward in the trough.

To apply the invention for rounding dough masses of various sizes the removable filler plate needs only to be so made as to cover the entire length of the trough, or such part of it as it is desired to use for the particular size to which the particular plate is adapted. And for this purpose the filler plate will be made so as to reduce the trough to a proper width and angle, with the working face of the plate either running at a uniform angle to the fixed race face and its opposite table face, or running at varying angles thereto so as to introduce the alternate successive compressing and releasing idea above set forth. Such an arrangement is illustrated in Figures 6 and 7. If the face of the removable plate is far enough away from the face of the fixed race, the plate 16ª may be thin with a space between it and the fixed race 14, and with occasional legs or struts 17 supporting it, as illustrated.

In any event, and for either of the purposes herein described, it will be understood that the plate may be made in as many and as large or small separable sections as are desired, along the course of the race; and that if compressive portions are arranged these may be repeated as frequently as the designer may wish.

I claim:

1. A forming machine for plastic material comprising a molding table combined with a race, which table and race are elements together constituting a complete and continuous support for receiving and molding the material, said elements being fixed in position relative to each other, and one of them rotating steadily relative to the other, the table being conical about a fixed vertical axis and the race being an upstanding wall, spiral and helical about the same axis and set close to the surface of the table to make therewith a material-receiving trough; the said race having a portion of its working face set at a gradually changing distance from the co-operating surface of table; gradually approaching and thereby applying steady skin drawing engagement to the material which is being molded while gradually changing the compressive molding pressure thereon.

2. A forming machine for plastic material comprising a molding table combined with a race, which table and race are elements together constituting a complete and continuous support for receiving and molding the material, said elements being fixed in position relative to each other, and one of them rotating steadily relative to the other, the table being conical about a fixed vertical axis and the race being an upstanding wall, spiral and helical about the same axis and set close to the surface of the table to make therewith a material-receiving trough; combined with a removable plate mounted on and extending along said wall and constituting a molding face, set closer to the co-operating face of the table than is the wall, whereby the machine is adapted for molding smaller size masses of material.

3. A forming machine for plastic material comprising a molding table combined with a race, which table and race are elements together constituting a complete and continuous support for receiving and molding the material, said elements being fixed in position relative to each other, and one of them rotating steadily relative to the other, the table being conical about a fixed vertical axis and the race being an upstanding wall, spiral about the same axis and set close to the surface of the table to make therewith a material-receiving trough; the said upstanding wall having its lower portion, in vertical cross-section, initially diverging abruptly from the face of the table, and having its upper portion less divergent from the table, and said race, in a subsequent portion of the course, having its upper portion still less divergent from the table.

Signed at Boston, Massachusetts, this ninth day of May, 1924.

GUNTHER H. PETRI.